US012761496B2

(12) United States Patent
Seo et al.

(10) Patent No.: US 12,761,496 B2

(45) Date of Patent: Oct. 13, 2026

(54) OPTICAL SYSTEM AND LASER DEVICE INCLUDING THE SAME

(71) Applicant: Samsung Display Co., LTD., Yongin-si (KR)

(72) Inventors: Jongoh Seo, Yongin-si (KR); Ji-Hwan Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 364 days.

(21) Appl. No.: 18/471,643

(22) Filed: Sep. 21, 2023

(65) Prior Publication Data

US 2024/0210720 A1 Jun. 27, 2024

(30) Foreign Application Priority Data

Dec. 22, 2022 (KR) ........................ 10-2022-0182275

(51) Int. Cl.
*G02B 27/64* (2006.01)
*G02B 19/00* (2006.01)

(52) U.S. Cl.
CPC ......... *G02B 27/64* (2013.01); *G02B 19/0047* (2013.01); *G02B 27/646* (2013.01)

(58) Field of Classification Search
USPC ........................... 369/112.01, 112.23, 112.24
See application file for complete search history.

(56) References Cited

U.S. PATENT DOCUMENTS

| | | | | |
|---|---|---|---|---|
| 12,208,466 B2 * | 1/2025 | Kim | ..................... | B23K 26/354 |
| 2019/0391459 A1 * | 12/2019 | Shin | ...................... | H01S 5/4075 |

FOREIGN PATENT DOCUMENTS

| | | | | |
|---|---|---|---|---|
| KR | 10-2006-0110853 | 10/2006 | | |
| KR | 10-2008-0025334 | 3/2008 | | |
| KR | 20190097980 A * | 8/2019 | ......... | B23K 26/0869 |
| KR | 10-2022-0030401 | 3/2022 | | |

* cited by examiner

*Primary Examiner* — Stephone B Allen
*Assistant Examiner* — Tamara Y. Washington
(74) *Attorney, Agent, or Firm* — Womble Bond Dickinson (US) LLP

(57) ABSTRACT

An optical system and a laser device including an optical system are provided. An optical system includes a first lens including a first surface and a second surface opposite to the first surface, the first lens having a first focal length, a second lens including a third surface and a fourth surface opposite to the third surface, the second lens having a second focal length, and a third lens between the first lens and the second lens and spaced apart from the first lens by twice the first focal length.

20 Claims, 6 Drawing Sheets

OPTICAL SYSTEM AND LASER DEVICE INCLUDING THE SAME

CROSS-REFERENCE TO RELATED APPLICATION

This application claims priority to and the benefit of Korean Patent Application No. 10-2022-0182275, filed on Dec. 22, 2022 in the Korean Intellectual Property Office (KIPO), the entire disclosure of which is incorporated herein by reference.

BACKGROUND

1. Field

Aspects of embodiments relate to an optical system. Further, aspects of embodiments relate to an optical system and a laser device including the same.

2. Description of The Related Art

In general, as a method for crystallizing an amorphous silicon layer into a polycrystalline silicon layer, solid phase crystallization (SPC), metal induced crystallization (MIC), metal induced lateral crystallization (MILC), and excimer laser annealing (ELA) are used. For example, the excimer laser annealing for crystallizing amorphous silicon into polycrystalline silicon using a laser beam is mainly used in a manufacturing process of an organic light emitting display device or a liquid crystal display device.

A laser device used in the excimer laser annealing (ELA) includes a laser generator that generates a source laser beam. The source laser beam is a raw laser beam that is not processed and has a rectangular cross section having a major axis and a minor axis. The source laser beam has energy distribution of a Gaussian distribution in both the major axis direction and the minor axis direction. The Gaussian distribution refers to a normal distribution that is laterally symmetrical about the mean.

However, when shaking occurs between a plurality of shots of the laser device, the energy distribution of the source laser beam may deviate from a normal distribution and may become laterally asymmetric. In this case, crystallization defects may occur in the polycrystalline silicon layer. For this reason, complex optical systems have been developed to remove the asymmetry of the source laser beam, but there may be problems in that light efficiency is lowered because a large number of optical lenses may be required, space may be limited, and beam alignment may be difficult.

SUMMARY

According to an aspect of embodiments of the present disclosure, an optical system is provided.

According to another aspect of embodiments of the present disclosure, a laser device including the optical system is provided.

According to one or more embodiments of the present disclosure, an optical system includes: a first lens comprising a first surface and a second surface opposite to the first surface, the first lens having a first focal length, a second lens comprising a third surface and a fourth surface opposite to the third surface, the second lens having a second focal length, and a third lens between the first lens and the second lens and spaced apart from the first lens by twice the first focal length.

In an embodiment, the first focal length may be smaller than the second focal length.

In an embodiment, the second focal length may be greater than or equal to 1.2 times the first focal length and less than or equal to 1.6 times the first focal length.

In an embodiment, a focal point of the first lens may be a first focal point and a focal point of the third lens may be a second focal point, the first focal point may be between the first lens and the third lens, and the second focal point may be between the third lens and the second lens.

In an embodiment, the second surface of the first lens and the third surface of the second lens may be parallel to each other.

In an embodiment, the first surface may have a convex curved shape in a direction from the second surface toward the first surface of the first lens, and the fourth surface may have a convex curved shape in a direction from the third surface toward the fourth surface of the second lens.

In an embodiment, the third lens may include a fifth surface and a sixth surface opposite to the fifth surface, the fifth surface may have a convex curved shape in a direction from the sixth surface toward the fifth surface of the third lens, and the sixth surface may have a convex curved shape in a direction from the fifth surface toward the sixth surface.

In an embodiment, the third lens may include a fifth surface and a sixth surface opposite to the fifth surface, and each of the fifth surface and the sixth surface may be aspherical.

In an embodiment, optical axes of the first lens, the second lens, and the third lens may be the same.

According to one or more embodiments of the present disclosure, a laser device includes: a beam generator to emit a first laser beam; and an optical system. The optical system includes: a first lens comprising a first surface and a second surface opposite to the first surface, the first lens having a first focal length, a second lens comprising a third surface and a fourth surface opposite to the third surface, the second lens having a second focal length, and a third lens between the first lens and the second lens and spaced apart from the first lens by twice the first focal length.

In an embodiment, the first focal length may be smaller than the second focal length.

In an embodiment, the second focal length may be greater than or equal to 1.2 times the first focal length and less than or equal to 1.6 times the first focal length.

In an embodiment, a focal point of the first lens may be a first focal point and a focal point of the third lens is a second focal point, the first focal point may be between the first lens and the third lens, and the second focal point may be between the third lens and the second lens.

In an embodiment, the second surface of the first lens and the third surface of the second lens may be parallel to each other.

In an embodiment, the first surface may have a convex curved shape in a direction from the second surface toward the first surface of the first lens, and the fourth surface may have a convex curved shape in a direction from the third surface toward the fourth surface of the second lens.

In an embodiment, the third lens may include a fifth surface and a sixth surface opposite to the fifth surface, the fifth surface may have a convex curved shape in a direction from the sixth surface toward the fifth surface of the third lens, and the sixth surface may have a convex curved shape in a direction from the fifth surface toward the sixth surface.

In an embodiment, the third lens may include a fifth surface and a sixth surface opposite to the fifth surface, and each of the fifth surface and the sixth surface may be aspherical.

In an embodiment, optical axes of the first lens, the second lens, and the third lens may be the same.

In an embodiment, a separation distance between the beam generator and the first lens may be the same as the first focal length.

In an embodiment, the first laser beam and a second laser beam passing through the optical system may have a same phase.

According to an aspect of one or more embodiments of the present disclosure, an optical system includes a first lens comprising a first surface and a second surface opposite to the first surface and having a first focal length, a second lens comprising a third surface and a fourth surface opposite to the third surface and having a second focal length, and a third lens disposed between the first lens and the second lens and spaced apart from the first lens by twice the first focal length. In this case, a phase of a laser beam passing through the first lens, the second lens, and the third lens may be the same as a phase obtained by inverting and re-inverting a phase of a laser beam before passing through the first lens. Accordingly, when aligning a raw laser beam, the beam may be more intuitively adjusted by aligning the beam based on the re-inverted phase.

DETAILED DESCRIPTION

Figure 1:
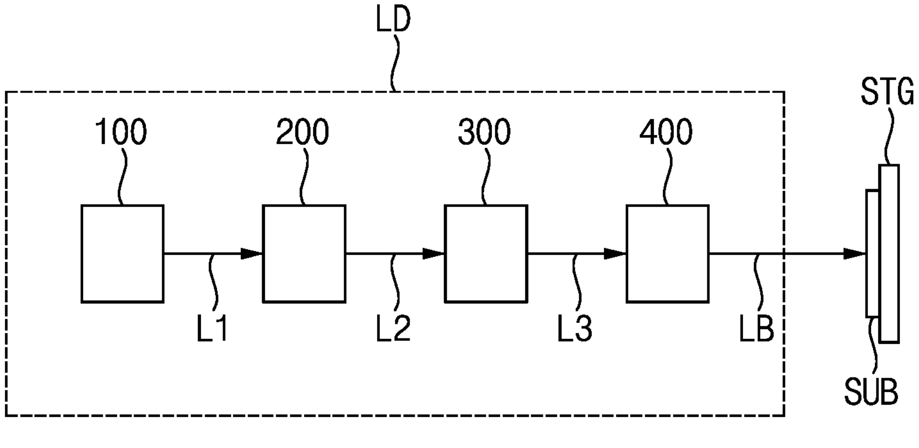
FIG. 1 is a block diagram illustrating a laser device according to an embodiment of the disclosure.

Herein, some embodiments will be described in further detail with reference to the accompanying drawings. The same reference numerals are used for the same components in the drawings, and redundant descriptions of the same components may be omitted.

It is to be understood that although terms such as "first" and "second" may be used herein to describe various components, these components are not limited by these terms, and the terms are used to distinguish one component from another.

As used herein, the singular forms "a," "an," and "the" are intended to include the plural forms as well, unless the context clearly indicates otherwise.

It is to be further understood that the terms "comprises" and/or "comprising" used herein specify the presence of stated features or components, but do not preclude the presence or addition of one or more other features or components.

It is to be understood that when a layer, area, or component is referred to as being "formed on" another layer, area, or component, it may be directly or indirectly formed on the other layer, area, or component. That is, for example, one or more intervening layers, areas, or components may be present.

When an embodiment may be implemented differently, a specific process order may be performed differently from the described order. For example, two consecutively described processes may be performed substantially at the same time or performed in an order opposite to the described order.

In embodiments set forth herein, when a layer, area, or component is connected to another layer, area, or component, the layers, areas, or components may be directly connected to each other, and the layers, areas, or components may also be indirectly connected to each other with another layer, area, or component therebetween.

Unless otherwise defined, all terms (including technical and scientific terms) used herein have the same meaning as commonly understood by one of ordinary skill in the art to which example embodiments of the inventive concept belong. It is to be further understood that terms, such as those defined in commonly-used dictionaries, should be interpreted as having a meaning that is consistent with their meaning in the context of the relevant art and will not be interpreted in an idealized or overly formal sense unless expressly so defined herein.

FIG. 1 is a block diagram of a laser device according to an embodiment of the disclosure.

Referring to FIG. 1, a laser device LD according to an embodiment of the disclosure may irradiate a laser beam LB to a substrate SUB disposed on a stage STG. The laser device LD, the stage STG, and the substrate SUB may be disposed in a process chamber. For example, the process chamber may be a vacuum chamber, a positive pressure chamber, or the like.

The laser device LD according to an embodiment of the disclosure may include a beam generator 100, a beam converter 200, a beam homogenizer 300, and a beam concentrator 400.

Each of the beam converter 200, the beam homogenizer 300, and the beam concentrator 400 may include at least one lens. A further detailed description of the lens will be provided later with reference to FIG. 2.

The beam generator 100, the beam converter 200, the beam homogenizer 300, and the beam concentrator 400 may be arranged in a direction. The direction may be defined as a direction parallel to an optical axis of at least one lens included in the beam converter 200. A further detailed description of the optical axis will be provided later with reference to FIG. 2.

The substrate SUB may be disposed between the beam concentrator 400 and the stage STG. FIG. 1 shows that the stage STG is disposed adjacent to a side of the beam concentrator 400 in a direction; however, embodiments of the present disclosure are not limited thereto. For example, the stage STG may be disposed under the beam concentrator 400. In this case, a reflective member or the like may be further disposed adjacent to the beam concentrator 400 to irradiate light output from the beam concentrator 400 to the substrate SUB disposed on the stage STG.

The beam generator 100 may emit a first laser beam L1. In an embodiment, the first laser beam L1 may be a linear laser beam. The first laser beam L1 may be provided to the beam converter 200.

The beam converter 200 may receive the first laser beam L1 from the beam generator 100 and may expand the first laser beam L1. However, embodiments of the present disclosure are not limited thereto, and the beam converter 200 may output the first laser beam L1 as is or narrow the first laser beam L1. In an embodiment, the beam converter 200 may expand the first laser beam L1 and output it as a second laser beam L2. The second laser beam L2 may be provided to the beam homogenizer 300.

The beam homogenizer 300 may receive the second laser beam L2 from the beam converter 200 and may split the second laser beam L2. In an embodiment, the beam homogenizer 300 may split the second laser beam L2 and may output it as a plurality of third laser beams L3. The plurality of third laser beams L3 may be provided to the beam concentrator 400.

The beam concentrator 400 may concentrate the plurality of third laser beams L3. In an embodiment, the beam concentrator 400 may concentrate the plurality of third laser beams L3 and may output them as the laser beam LB. The laser beam LB may be provided to the substrate SUB.

The laser beam LB may be irradiated to the substrate SUB. For example, the laser beam LB may be formed using XeCl, XeF, Nd-YAG, or the like. In an embodiment, a peak wavelength of the laser beam LB may be about 308 nanometer (nm), about 351 nm, and about 532 nm, respectively.

The laser beam LB may perform a crystallization process. For example, a semiconductor layer may be disposed on the substrate SUB. The semiconductor layer may include amorphous silicon (a-Si). When the laser beam LB is irradiated, the amorphous silicon may be crystallized into crystalline silicon (poly-Si). That is, as the laser beam LB is irradiated, the semiconductor layer may include the poly-silicon.

Figure 2:
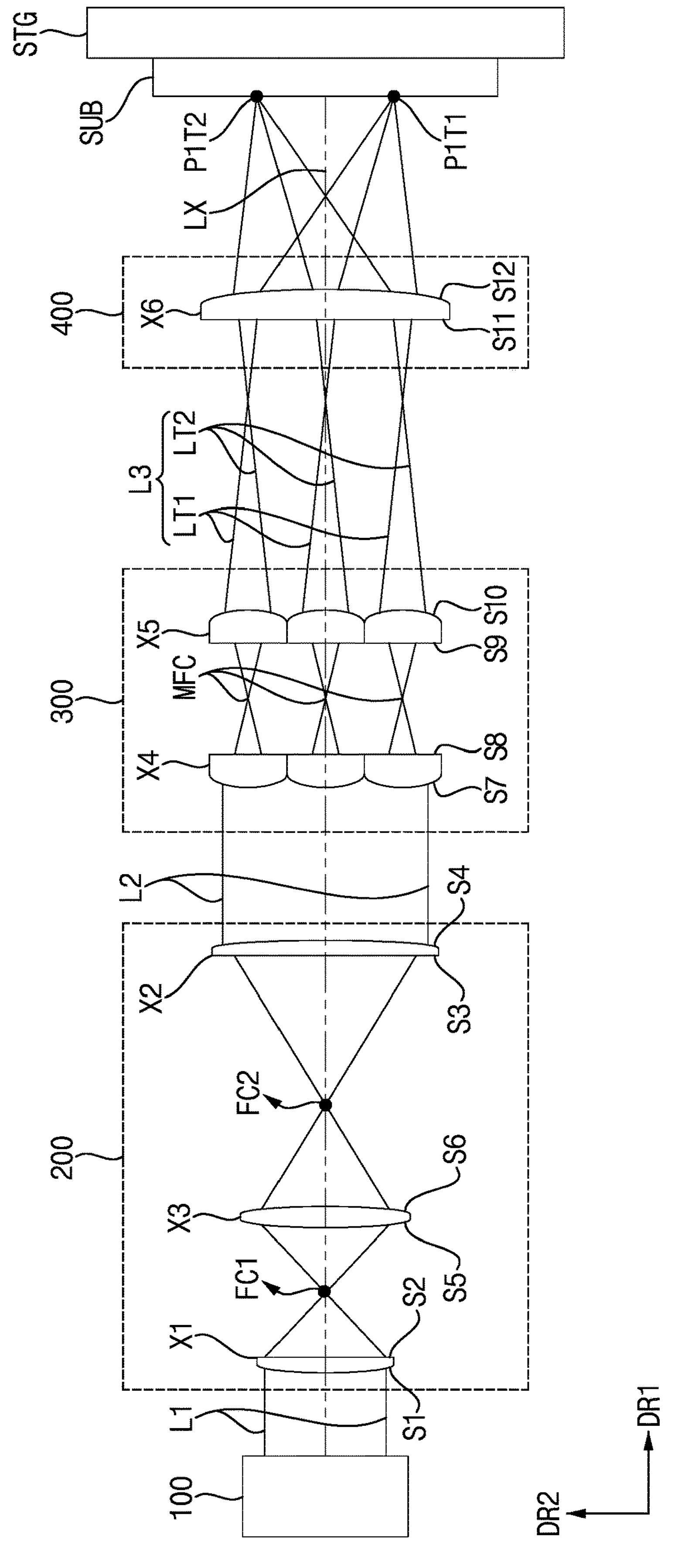
FIGS. 2 and 3 are views illustrating an optical system included in the laser device of FIG. 1.
Figure 3:
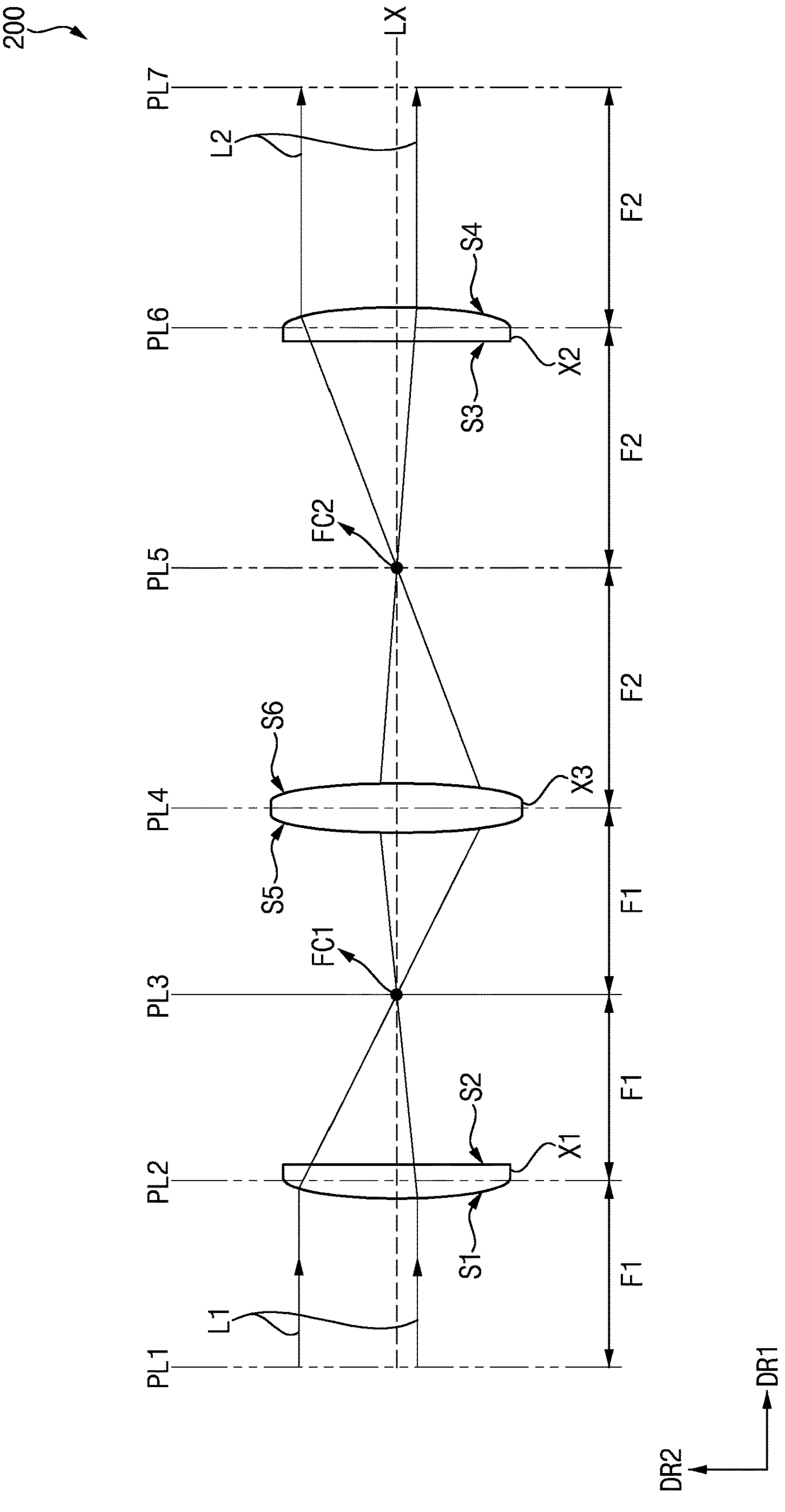

FIGS. 2 and 3 are views illustrating an optical system included in the laser device of FIG. 1.

For example, FIGS. 2 and 3 are views illustrating a configuration of lenses included in the beam converter 200 included in the laser device LD of FIG. 1.

Referring to FIGS. 2 and 3, the beam converter 200 may convert the first laser beam L1 into the second laser beam L2 having a same phase as a re-inverted phase of the first laser beam L1. In an embodiment, the beam converter 200 may include a first lens X1, a second lens X2, and a third lens X3.

In an embodiment, the first lens X1 may include a first surface S1 and a second surface S2 opposite to the first surface S1. The second lens X2 may include a third surface S3 and a fourth surface S4 opposite to the third surface S3. The third lens X3 may include a fifth surface S5 and a sixth surface S6 opposite to the fifth surface S5. The third lens X3 may be disposed between the first lens X1 and the second lens X2.

The first surface S1 may be a surface on which the first laser beam L1 is incident. More specifically, the first surface S1 may face the beam generator 100.

The second surface S2 may be a surface from which the first laser beam L1 passing through the first lens X1 is emitted. More specifically, the second surface S2 may face the third lens X3.

The third surface S3 may be a surface on which the first laser beam L1 passing through the third lens X3 is incident. More specifically, the third surface S3 may face the third lens X3.

The fourth surface S4 may be a surface from which the first laser beam L1 passing through the second lens X2 is emitted. More specifically, the fourth surface S4 may face the beam homogenizer 300.

The fifth surface S5 may be a surface on which the first laser beam L1 passing through the first lens X1 is incident. More specifically, the fifth surface S5 may face the first lens X1.

The sixth surface S6 may be a surface from which the first laser beam L1 passing through the third lens X3 is emitted. More specifically, the sixth surface S6 may face the second lens X2.

In an embodiment, each of the first lens X1 and the second lens X2 may be a plane-convex lens. In an embodiment, the first surface S1 may have a convex curved surface, and the second surface S2 may have a substantially flat surface. In an embodiment, the first surface S1 may have the convex curved surface shape in a direction from the second surface S2 of the first lens X1 toward the first surface S1 (e.g., in a direction opposite to a first direction DR1), and the second surface S2 may have the flat surface shape parallel to a second direction DR2. The second direction DR2 may cross the first direction DR1. For example, the second direction DR2 may be perpendicular to the first direction DR1.

The fourth surface S4 of the second lens X2 may have the convex curved surface shape opposite to the first surface S1 of the first lens X1, and the third surface S3 of the second lens X2 may have the flat surface shape parallel to the second surface S2 of the first lens X1. In an embodiment, the fourth surface S4 may have the convex curved surface shape in a direction from the third surface S3 of the second lens X2 toward the fourth surface S4 (e.g., in the first direction DR1), and the third surface S3 may have the flat surface shape parallel to the second direction DR2.

However, embodiments of the present disclosure are not limited thereto. The first surface S1 of the first lens X1 may have the flat surface shape, and the second surface S2 may have the curved surface shape. In another embodiment, both the first surface S1 and the second surface S2 of the first lens X1 may have the curved surface shape.

In an embodiment, the fourth surface S4 of the second lens X2 may have the flat surface shape, and the third surface S3 may have the curved surface shape. In another embodiment, both the third surface S3 and the fourth surface S4 of the second lens X2 may have the curved shape.

In an embodiment, the third lens X3 may be a biconvex lens (double convex lens). In an embodiment, each of the fifth surface S5 and the sixth surface S6 may have the convex curved surface. In an embodiment, the fifth surface S5 may have the convex curved surface shape in a direction from the sixth surface S6 of the third lens X3 toward the fifth surface S5 (e.g., in the direction opposite to the first direction DR1), and the sixth surface S6 may also have the convex curved surface shape in a direction from the fifth surface S5 of the third lens X3 toward the sixth surface S6 (e.g., in the first direction DR1).

In an embodiment, the third lens X3 may be a bi-aspheric lens (double aspheric lens) having processed opposite surfaces to remove spherical aberration.

In an embodiment, the first lens X1, the second lens X2, and the third lens X3 may have a same optical axis LX. The optical axis LX may be an optical axis of each of the first lens X1, the second lens X2, and the third lens X3. The above-described beam generator 100, the beam converter 200, the beam homogenizer 300, and the beam concentrator 400 may be arranged along the optical axis LX.

The first laser beam L1 may be inverted at an origin while passing through the beam converter 200 and then converted into a re-inverted second laser beam L2. Accordingly, the first laser beam L1 and the second laser beam L2 may have the same phase.

The first laser beam L1 passing through the first lens X1 may be focused at a first focal point FC1. The first focal point FC1 may be positioned between the first lens X1 and the third lens X3.

The beam generator 100 may be positioned on a first plane PL1, and the first lens X1 may be positioned on a second plane PL2. A distance at which the first plane PL1 and the second plane PL2 are separated from each other may be a first focal distance (or focal length) F1. In other words, with respect to the first direction DR1, a distance between the beam generator 100 and the first lens X1 may be equal to the first focal distance F1.

The first lens X1 may be positioned on the second plane PL2, and the third lens X3 may be positioned on a fourth plane PL4. A focal point of the first lens X1 (i.e., the first focal point FC1) may be positioned on a third plane PL3 between the first lens X1 and the third lens X3. A distance at which the second plane PL2 and the third plane PL3 are separated from each other may be the first focal distance F1. In addition, a distance at which the third plane PL3 and the fourth plane PL4 are separated from each other may also be the first focal distance F1. Accordingly, the first laser beam L1 passing through the first lens X1 may be concentrated at the first focal point FC1, then reversed, and then incident to the third lens X3.

The third lens X3 may be positioned on the fourth plane PL4, and the second lens X2 may be positioned on a sixth plane PL6. A focal point of the third lens X3 (i.e., a second focal point FC2) may be positioned on a fifth plane PL5 between the third lens X3 and the second lens X2. A distance at which the fourth plane PL4 and the fifth plane PL5 are separated from each other may be a second focal distance (or focal length) F2. In addition, a distance at which the fifth plane PL5 and the sixth plane PL6 are spaced apart from each other may also be the second focal distance F2. Accordingly, the first laser beam L1 passing through the third lens X3 may be concentrated at the second focal point FC2, then re-inverted, and then incident to the second lens X2.

In this case, a focal point of the second lens X2 may be substantially the same as the focal point of the third lens X3. That is, the focal point of the second lens X2 may also be the second focal point FC2.

The second lens X2 may be positioned on the sixth plane PL6, and the beam homogenizer 300 may be positioned on a seventh plane PL7. A distance at which the sixth plane PL6 and the seventh plane PL7 are spaced apart from each other may be the second focal distance F2. In other words, with respect to the first direction DR1, a distance between the second lens X2 and the beam homogenizer 300 may be equal to the second focal distance F2.

The first lens X1 may have the first focal distance F1, and the second lens X2 may have the second focal distance F2. In an embodiment, the first focal distance F1 between the first lens X1 and the first focal point FC1 may be smaller than the second focal distance F2 between the second lens X2 and the second focal point FC2.

A separation distance between the first lens X1 and the third lens X3 may be equal to about twice the first focal distance F1. In other words, the third lens X3 may be spaced apart from the first lens X1 by about twice the first focal distance F1 in the first direction DR1. A position separated from the first lens X1 by about twice the first focal distance F1 in the first direction DR1 may be a position where the inverted phase of the first lens X1 is formed.

A separation distance between the third lens X3 and the second lens X2 may be equal to about twice the second focal distance F2. In other words, the second lens X2 may be spaced apart from the third lens X3 by about twice the second distance F2 in the first direction DR1. A position separated from the third lens X3 by about twice the second focal distance F2 in the first direction DR1 may be a position where the re-inverted phase of the inverted phase is formed.

In a case of a laser device according to a comparative example, only the first lens and the second lens may be included. In this case, a phase of a laser beam passing through the first lens and the second lens may have the inverted phase from the phase of the laser beam before passing through the first lens. Accordingly, aligning a raw laser beam based on the inverted phase may be difficult.

On the other hand, in the laser device according to an embodiment of the present disclosure (e.g., the laser device LD of FIG. 1), the first lens X1, the second lens X2, and the third lens X3 are included. In this case, the phase of the second laser beam L2 passing through the first lens X1, the second lens X2, and the third lens X3 may be the same as the re-inverted phase of the first laser beam L1 before passing through the first lens X1. Accordingly, the laser device according to an embodiment of the present disclosure may align the raw laser beam based on the re-inverted phase and thus may align the laser beam more intuitively than the laser device according to the comparative example.

In an embodiment, the second focal distance F2 may be about 1.2 times greater than the first focal distance F1 and less than or equal to about 1.6 times the first focal distance F1.

When the second focal distance F2 is less than about 1.2 times the first focal distance F1, or when the second focal distance F2 exceeds about 1.6 times the first focal distance F1, due to a shaking of a gas laser characteristic, the laser beam LB may be irradiated on a portion out of a normal irradiation portion of the seventh plane PL7. Accordingly, in the substrate SUB, a portion where the crystallization process is not performed may occur. Accordingly, in an embodiment, the second focal distance F2 may be greater than or equal to about 1.2 times the first focal distance F1 and less than or equal to about 1.6 times the first focal distance F1.

The normal irradiation portion may be defined as a portion of the seventh plane PL7 to which the second laser beam L2 should be incident in order to normally perform the crystallization process. When the second laser beam L2 is irradiated to the normal irradiation portion, the laser beam LB is normally irradiated to the substrate SUB, such that the crystallization process may be normally performed. On the other hand, when the second laser beam L2 is irradiated to the portion out of the normal irradiation portion, the laser beam LB may not be normally irradiated to the substrate SUB and, in the substrate SUB, the portion where the crystallization process is not normally performed may occur.

In an embodiment, the beam homogenizer 300 may include a plurality of fourth lenses X4 and a plurality of fifth lenses X5.

The plurality of fourth lenses X4 may be disposed between the second lens X2 and the plurality of fifth lenses X5. The plurality of fifth lenses X5 may be disposed between the plurality of fourth lenses X4 and the beam concentrator 400. In an embodiment, the plurality of fifth lenses X5 may be arranged to correspond 1:1 to the plurality of fourth lenses X4 in the first direction DR1. Accordingly, each of the plurality of fifth lenses X5 may face a corresponding fourth lens X4 of the plurality of fourth lenses X4 in the first direction DR1.

The plurality of fourth lenses X4 may include a plurality of seventh surfaces S7 and a plurality of eighth surfaces S8. The plurality of fifth lenses X5 may include a plurality of ninth surfaces S9 and a plurality of tenth surfaces S10.

The plurality of seventh surfaces S7 may be surfaces on which the second laser beam L2 is incident. The plurality of seventh surfaces S7 may face the second lens X2.

The plurality of eighth surfaces S8 may be surfaces from which the second laser beam L2 passing through the plurality of fourth lenses X4 is emitted. The plurality of eighth surfaces S8 may face the plurality of fifth lenses X5.

The plurality of ninth surfaces S9 may be surfaces on which the second laser beam L2 is incident. The plurality of ninth surfaces S9 may face the plurality of fourth lenses X4.

The plurality of tenth surfaces S10 may be surfaces from which the second laser beam L2 passing through the plurality of fifth lenses X5 is emitted. The plurality of tenth surfaces S10 may face the beam concentrator 400.

In an embodiment, each of the plurality of fourth lenses X4 and the plurality of fifth lenses X5 may be a plane-convex lens.

In an embodiment, the plurality of seventh surfaces S7 may have a convex curved surface, and the plurality of eighth surfaces S8 may have a substantially flat surface. The plurality of seventh surfaces S7 may have the convex curved surface shape in a direction from the plurality of eighth surfaces S8 of the plurality of fourth lenses X4 toward the plurality of seventh surfaces S7 (e.g., in the direction opposite to the first direction DR1), and the plurality of eighth surfaces S8 may have the flat surface shape parallel to the second direction DR2.

In an embodiment, the plurality of tenth surfaces S10 may have the convex curved surface shape, and the plurality of ninth surfaces S9 may have the flat surface shape. The plurality of tenth surfaces S10 may have the convex curved surface shape in a direction from the plurality of ninth surfaces S9 of the plurality of fifth lenses X5 toward the plurality of tenth surfaces S10 (e.g., in the first direction DR1), and the plurality of ninth surfaces S9 may have the flat surface shape parallel to the second direction DR2.

However, embodiments of the present disclosure are not limited thereto. In an embodiment, the plurality of seventh surfaces S7 of the plurality of fourth lenses X4 may have the flat surface shape, and the plurality of eighth surfaces S8 may have the curved surface shape. In another embodiment, both the plurality of seventh surfaces S7 and the plurality of eighth surfaces S8 of the plurality of fourth lenses X4 may have the curved surface shape.

In an embodiment, the plurality of fourth lenses X4, the second lens X2, and the third lens X3 may have the same optical axis LX. The optical axis LX may be an optical axis of each of the first lens X1, the second lens X2, and the third lens X3. The above-described beam generator 100, the beam converter 200, the beam homogenizer 300, and the beam concentrator 400 may be arranged along the optical axis LX.

In an embodiment, each of the plurality of fourth lenses X4 and the plurality of fifth lenses X5 may have a same size as each other. Each of the plurality of fourth lenses X4 and the plurality of fifth lenses X5 may be arranged side by side in the second direction DR2. In FIG. 2, it is illustrated that each of the plurality of fourth lenses X4 and the plurality of fifth lenses X5 is three; however, embodiments of the present disclosure are not limited thereto.

The second laser beam L2 output from the second lens X2 may be split into a plurality of beams while passing through the beam homogenizer 300. The plurality of beams may be concentrated at a plurality of focal points MFC, expanded again, and emitted as the plurality of third laser beams L3. The plurality of focal points MFC may be positioned between the plurality of fourth lenses X4 and the plurality of fifth lenses X5.

In an embodiment, the beam concentrator 400 may include a condenser lens X6.

The condenser lens X6 may include an eleventh surface S11 facing the plurality of fifth lenses X5 and a twelfth surface S12 facing the stage STG. The eleventh surface S11 may have a flat surface shape parallel to the second direction DR2, and the twelfth surface S12 may have a convex curved surface shape in a direction from the eleventh surface S11 to the twelfth surface S12 of the condenser lens X6 (e.g., the first direction DR1). However, embodiments of the present disclosure are not limited thereto. In an embodiment, the eleventh surface S11 of the condenser lens X6 may have the flat surface shape, and the twelfth surface S12 may have the curved surface shape. In another embodiment, both the eleventh surface S11 and the twelfth surface S12 of the condenser lens X6 may have curved surface shapes.

The plurality of third laser beams L3 may be concentrated while passing through the condenser lens X6. For example, the plurality of third laser beams L3 may include parallel first lights LT1, and second lights LT2 that cross the first lights LT1 and may be parallel to each other. The first lights LT1 may be focused on a first point P1T1 of the substrate SUB while passing through the condenser lens X6, and the second lights LT2 may be focused on a second point P1T2 of the substrate SUB while passing through the condenser lens X6.

Figure 4:
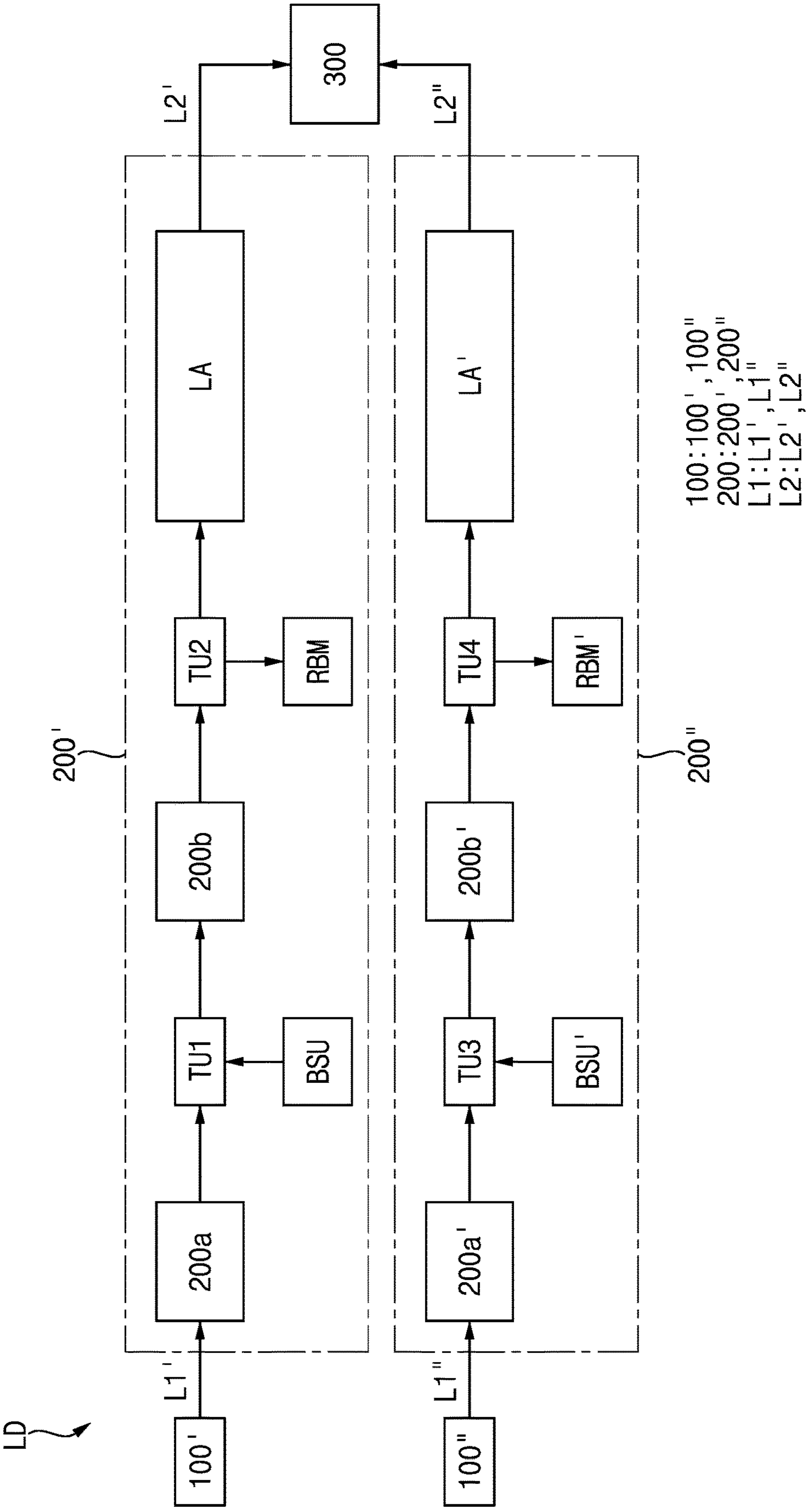
FIG. 4 is a block diagram illustrating a laser device according to an embodiment of the disclosure.
Figure 5:
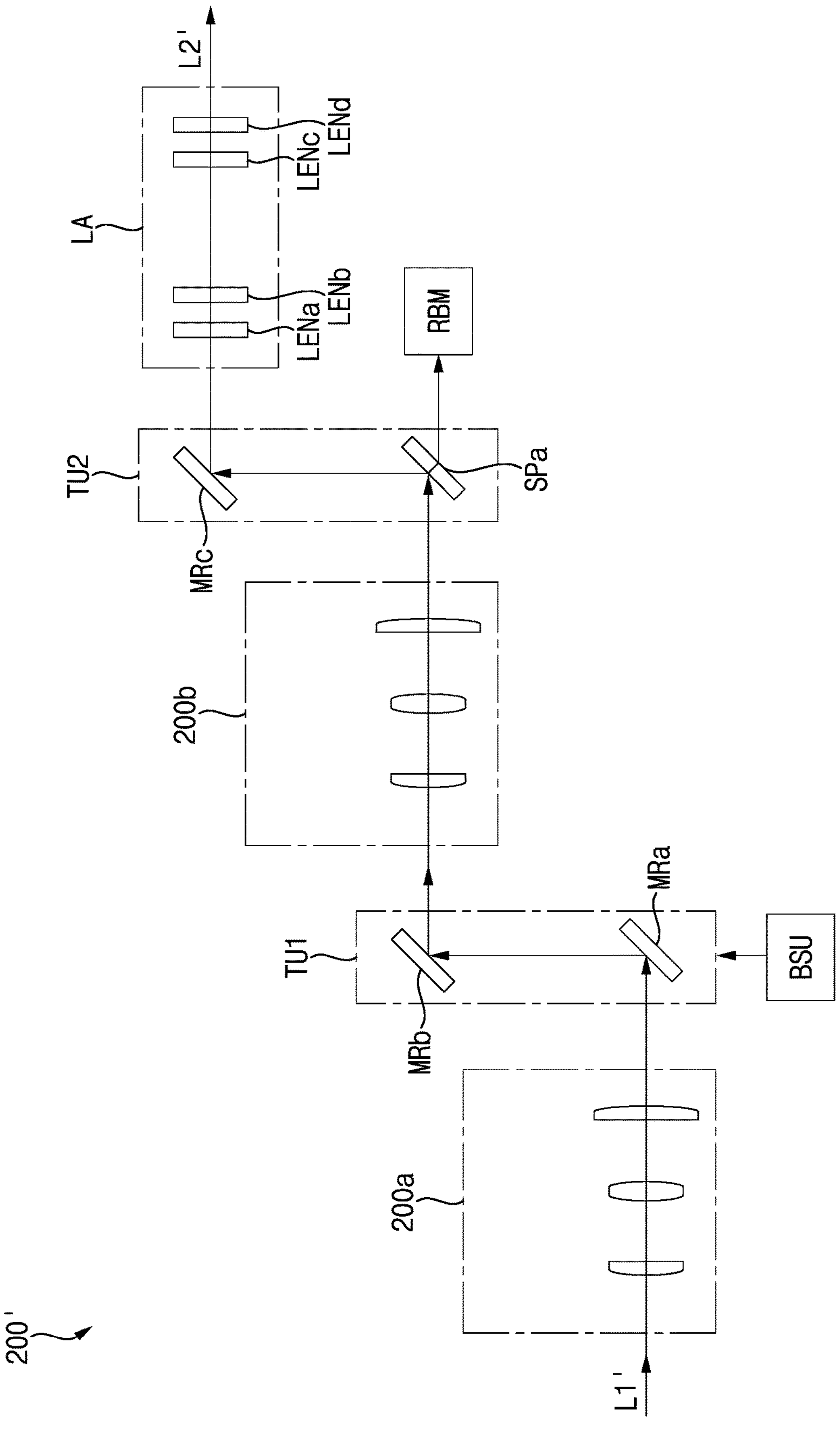
FIG. 5 is a view illustrating a beam converter included in the laser device of FIG. 4.
Figure 6:
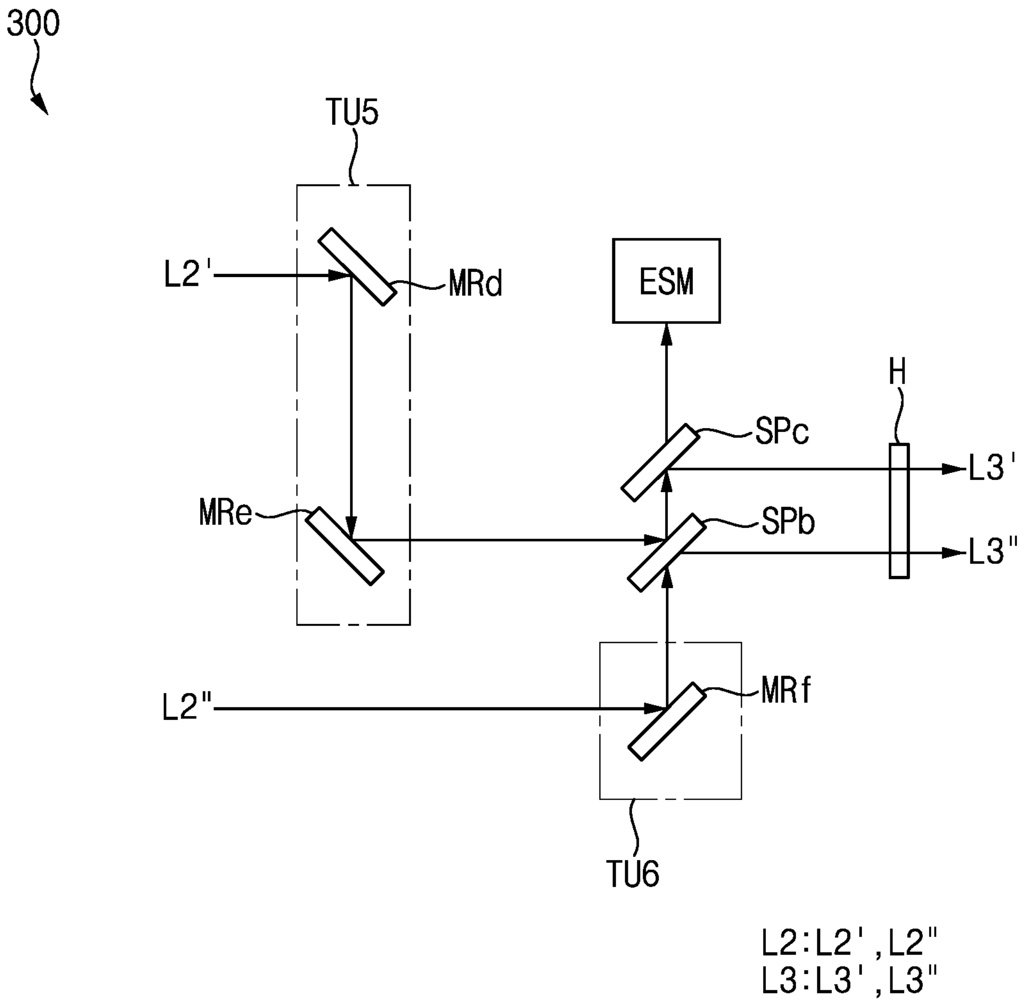
FIG. 6 is a view illustrating a beam homogenizer included in the laser device of FIG. 4.

FIG. 4 is a block diagram illustrating a laser device according to an embodiment of the present disclosure; FIG. 5 is a view illustrating a beam converter included in the laser device of FIG. 4; and FIG. 6 is a view illustrating a beam homogenizer included in the laser device of FIG. 4. Herein, the laser device LD as described above with reference to FIGS. 1, 2, and 3 will be omitted or simplified.

Referring to FIG. 4, the laser device LD according to an embodiment of the disclosure may include a first beam generator 100' that emits a first laser beam L1' according to an embodiment, a second beam generator 100" that emits a first laser beam L1" according to an embodiment, a first beam converter 200' that emits a second laser beam L2' according to an embodiment having the same phase as the re-inverted phase of the first laser beam L1' according to an embodiment, a second beam converter 200" that emits a second laser beam L2" according to another embodiment having a same phase as the re-inverted phase of the second laser beam L1" according to an embodiment, and the beam homogenizer 300 that emits the plurality of third laser beams L3 having relatively more homogenized energy distribution than the second laser beam L2' according to an embodiment and the second laser beam L2" according to an embodiment.

The first laser beam L1 may be a linear laser beam. In an embodiment, each of the first laser beam L1' according to an embodiment and the first laser beam L1" according to an embodiment may be substantially a same laser beam. However, embodiments of the present disclosure are not limited thereto, and the first laser beam L1' according to an embodiment, and the first laser beam L1" according to an embodiment may be a beam that has different optical properties such as phase and intensity.

In an embodiment, the first beam converter 200' may include a first optical system 200*a*, a first transfer optical system TU1, a second optical system 200*b*, a second transfer optical system TU2, and a first lens array LA.

The first laser beam L1' according to an embodiment passing through the first optical system 200*a* may be transferred to the second optical system 200*b* through the first transfer optical system TU1. The first laser beam L1' according to an embodiment passing through the second optical system 200*b* may be transferred to the first lens array LA through the second transfer optical system TU2.

In addition, the first beam converter 200' may further include a first beam stabilization unit BSU and a first raw beam monitoring unit RBM.

The first beam stabilization unit BSU may be connected to the first transfer optical system TU1 to adjust a long axis and a short axis of the raw laser beam. The first raw beam monitoring unit RBM may inspect a variation (e.g., phase distribution) of a laser beam passing through the second transfer optical system TU2.

In an embodiment, the first beam converter 200' and the second beam converter 200" may be substantially the same. For example, each of the first optical system 200*a*, the first transfer optical system TU1, the second optical system 200*b*, the second transfer optical system TU2, the first lens array LA, the first beam stabilization unit BSU, and the first raw beam monitoring unit RBM may correspond to each of a third optical system 200*a*', a third transfer optical system TU3, a fourth optical system 200*b*', a fourth transfer optical system TU4, a second lens array LA', a second beam stabilization unit BSU', and a second raw beam monitoring unit RBM'. In an embodiment, the first to fourth optical systems 200*a*, 200*b*, 200*a*', and 200*b'* may be substantially the same as the beam converter 200 described above with reference to FIGS. 1 to 3. Therefore, herein, for convenience of description, a further description of each of the first to fourth optical systems 200*a*, 200*b*, 200*a*', and 200*b'* will be omitted.

Referring to FIGS. 4 and 5, the first beam converter 200' may include the first optical system 200*a*, the first transfer optical system TU1, the second optical system 200*b*, the second transfer optical system TU2, the first lens array LA, the first beam stabilization unit BSU, and the first raw beam monitoring unit RBM.

The first laser beam L1' according to an embodiment may be converted into the second laser beam L2' according to an embodiment by in turn passing through the first optical system 200*a*, the first transfer optical system TU1, the second optical system 200*b*, the second transfer optical system TU2, and the first lens array LA. A phase of the second laser beam L2' according to an embodiment may have the same phase as the re-inverted phase of the first laser beam L1' according to an embodiment.

The laser beam emitted from the first optical system 200*a* may be transferred to the second optical system 200*b* through the first transfer optical system TU1. In an embodiment, the first transfer optical system TU1 may include a first mirror MRa and a second mirror MRb.

The first mirror MRa may reflect the laser beam emitted from the second lens (e.g., the second lens X2 of FIG. 2) of the first optical system 200*a* and may transfer the reflected laser beam to the second mirror MRb. The second mirror MRb may reflect the laser beam reflected by the first mirror MRa and may transfer the reflected laser beam to the first lens (e.g., the first lens X1 of FIG. 2) of the second optical system 200*b*.

In an embodiment, each of the first mirror MRa and the second mirror MRb may be connected to the first beam stabilization unit BSU. The first beam stabilization unit BSU may stabilize the beam by automatically adjusting a long axis position and a short axis position of the raw laser beam. In an embodiment, each of the first mirror MRa and the second mirror MRb may further include a motor, and the first beam stabilization unit BSU may control a movement of the motor.

The laser beam emitted from the second optical system 200*b* may be transferred to the first lens array LA through the second transfer optical system TU2. In an embodiment, the second transfer optical system TU2 may include a first splitter SPa and a third mirror MRc. The first splitter SPa may reflect some of the laser beam emitted from the second optical system 200*b* and may transmit other of the laser beam. The third mirror MRc may reflect the laser beam reflected by the first splitter SPa again and transfer the reflected laser beam to the first lens array LA.

In an embodiment, the laser beam transferred through the first splitter SPa may be transferred to the first raw beam monitoring unit RBM. The first raw beam monitoring unit RBM may inspect the variation (e.g., the phase distribution) of the laser beam transferred through the first splitter SPa.

The first lens array LA may include a plurality of lenses. In an embodiment, the first lens array LA may include a short-axis homogenizing lens array and a long-axis homogenizing lens array. For example, the short-axis homogenizing lens array may include a first short-axis homogenizing lens LENa and a second short-axis homogenizing lens LENd. The long-axis homogenizing lens array may include a first long-axis homogenizing lens LENb and a second long-axis homogenizing lens LENc.

The short-axis homogenizing lens array may homogenize the laser beam in a direction, and the long-axis homogenizing lens array may homogenize the laser beam in another direction crossing the direction. Accordingly, the laser beam emitted from the second transfer optical system TU2 may pass through the first lens array LA and may be homogenized in the direction and the another direction.

In an embodiment, the long-axis homogenizing lens array may be disposed between the first short-axis homogenizing lens LENa and the second short-axis homogenizing lens LENd. In an embodiment, the laser beam emitted from the second transfer optical system TU2 may pass through, in turn, the first short-axis homogenizing lens LENa, the first long-axis homogenizing lens LENb, the second long-axis homogenizing lens LENc, and the second short-axis homogenizing lens LENd.

In another embodiment, the short-axis homogenizing lens array may be disposed between the first long-axis homogenizing lens LENb and the second long-axis homogenizing lens LENc. That is, the laser beam emitted from the second transfer optical system TU2 may pass through, in turn, the first long-axis homogenizing lens LENb, the first short-axis homogenizing lens LENa, the second short-axis homogenizing lens LENd, and the second long-axis homogenizing lens LENc.

In FIG. 5, the first beam converter 200' has been mainly described. In an embodiment, the first beam converter 200' and the second beam converter 200" may be substantially the same. For example, the second beam converter 200" may include the third optical system 200*a*', the third transfer optical system TU3, the fourth optical system 200*b*', the fourth transfer optical system TU4, the second lens array LA', the second beam stabilization unit BSU' and the second raw beam monitoring unit RBM'.

The first laser beam L1" according to an embodiment may be converted into the second laser beam L2" according to an embodiment by passing through, in turn, the third optical system 200*a*', the third transfer optical system TU3, the fourth optical system 200*b*', the fourth transfer optical system TU4, and the second lens array LA'. A phase of the second laser beam L2" according to an embodiment may have a same phase as the re-inverted phase of the first laser beam L1" according to an embodiment.

The laser beam emitted from the third optical system 200*a'* may be transferred to the fourth optical system 200*b'* through the third transfer optical system TU3. To this end, the third transfer optical system TU3 may include two reflection mirrors. In this case, each of the reflection mirrors may be connected to the second beam stabilization unit BSU'.

The laser beam emitted from the fourth optical system 200*b'* may be transferred to the second lens array LA' through the fourth transfer optical system TU4. In an embodiment, the fourth transfer optical system TU4 may include at least one splitter and at least one reflection mirror.

The laser beam transmitted through the splitter included in the fourth transfer optical system TU4 may be transferred to the second raw beam monitoring unit RBM'.

The second lens array LA' may include a plurality of lenses. In an embodiment, the second lens array LA' may include the short-axis homogenizing lens array and the long-axis homogenizing lens array.

Referring to FIG. 6, the beam homogenizer 300 may include a fifth transfer optical system TU5, a sixth transfer optical system TU6, a second splitter SPb, a third splitter SPc, a homogenizer H, and an energy sigma monitoring unit ESM. The homogenizer H may correspond to the homogenizer 300 described above with reference to FIGS. 1 and 2.

The fifth transfer optical system TU5 may reflect and transfer the second laser beam L2' according to an embodiment to the second splitter SPb. In an embodiment, the fifth transfer optical system TU5 may include a fourth mirror MRd and a fifth mirror MRe. The fourth mirror MRd may reflect the second laser beam L2' according to an embodiment. The fifth mirror MRe may reflect and transfer the second laser beam L2' according to an embodiment reflected by the fourth mirror MRd to the second splitter SPb. In this case, the second laser beam L2' according to an embodiment may be incident to a first surface of the second splitter SPb.

The sixth transfer optical system TU6 may reflect and transfer the second laser beam L2" according to an embodiment to the second splitter SPb. In an embodiment, the sixth transfer optical system TU6 may include a sixth mirror MRf that reflects and transfers the second laser beam L2" according to an embodiment to the second splitter SPb. In this case, the second laser beam L2" according to an embodiment may be incident to a second surface of the second splitter SPb. The second surface may be a surface opposite to the first surface.

The second splitter SPb may reflect some of the second laser beam L2' according to an embodiment reflected from the fifth transfer optical system TU5 and may transmit other of the second laser beam. In addition, the second splitter SPb may reflect some of the second laser beam L2' according to an embodiment reflected from the sixth transfer optical system TU6 and may transmit other of the laser beam.

In this case, the second laser beam L2' according to an embodiment transferred through the second splitter SPb and the second laser beam L2" according to an embodiment reflected from the second splitter SPb may be transferred to the homogenizer H. In addition, the second laser beam L2' according to an embodiment reflected from the second splitter SPb and the second laser beam L2" according to an embodiment transmitted from the second splitter SPb may be transferred to the third splitter SPc.

The third splitter SPc may reflect some of the laser beam received from the second splitter SPb and may transmit other of the second laser beam. In an embodiment, the laser beam reflected from the third splitter SPc may be transferred to the homogenizer H, and the laser beam transferred through the third splitter SPc may be transferred to the energy sigma monitoring unit ESM. Accordingly, the energy sigma monitoring unit ESM may inspect a waveform characteristic of the laser beam transmitted through the third splitter SPc.

The homogenizer H may homogenize the laser beam transferred from the second splitter SPb and the third splitter SPc, and may convert the transferred laser beam into the plurality of third laser beams L3 (e.g., third laser beams L3' and L3"). The beam homogenizer 300 may mix the second laser beam L2' according to an embodiment and the second laser beam L2" according to an embodiment. Accordingly, the plurality of third laser beams L3 having more homogeneous energy distribution than that of the second laser beam L2 may be formed.

In FIGS. 4, 5, and 6, it has been described that the laser device LD includes all of the first to fourth optical systems 200*a*, 200*b*, 200*a'*, and 200*b'*. However, embodiments of the present disclosure are not limited thereto. In an embodiment, for example, the laser device LD may include only the first optical system 200*a* and the third optical system 200*a'*. In another embodiment, the laser device LD may include only the second optical system 200*b* and the fourth optical system 200*b'*.

Although some embodiments have been described with reference to the drawings, the illustrated embodiments are provided as examples, and may be modified and changed by a person having ordinary knowledge in the relevant technical field without departing from the technical spirit set forth in the following claims.

An organic light emitting display device and various electronic devices including the same may be manufactured using the optical system and the laser device including the optical system of the present disclosure. For example, the present disclosure may be applied in manufacturing any of mobile phones, smartphones, video phones, smart pads, smart watches, tablet PCs, car navigation systems, televisions, computer monitors, notebooks, head mounted displays, and the like.

What is claimed is:

1. An optical system comprising:

a first lens comprising a first surface and a second surface opposite to the first surface, the first lens having a first focal length;

a second lens comprising a third surface and a fourth surface opposite to the third surface, the second lens having a second focal length; and a third lens between the first lens and the second lens, the third lens spaced apart from the first lens by twice the first focal length.

2. The optical system of claim 1, wherein the first focal length is smaller than the second focal length.

3. The optical system of claim 2, wherein the second focal length is greater than or equal to 1.2 times the first focal length and less than or equal to 1.6 times the first focal length.

4. The optical system of claim 1, wherein a focal point of the first lens is a first focal point and a focal point of the third lens is a second focal point, the first focal point is between the first lens and the third lens, and the second focal point is between the third lens and the second lens.

5. The optical system of claim 1, wherein the second surface of the first lens and the third surface of the second lens are parallel to each other.

6. The optical system of claim 1, wherein
the first surface has a convex curved shape in a direction from the second surface toward the first surface of the first lens, and
the fourth surface has a convex curved shape in a direction from the third surface toward the fourth surface of the second lens.

7. The optical system of claim 1, wherein
the third lens comprises a fifth surface and a sixth surface opposite to the fifth surface,
the fifth surface has a convex curved shape in a direction from the sixth surface toward the fifth surface of the third lens, and
the sixth surface has a convex curved shape in a direction from the fifth surface toward the sixth surface.

8. The optical system of claim 1, wherein
the third lens comprises a fifth surface and a sixth surface opposite to the fifth surface, and
each of the fifth surface and the sixth surface is aspherical.

9. The optical system of claim 1, wherein optical axes of the first lens, the second lens, and the third lens are the same.

10. A laser device comprising:
a beam generator to emit a first laser beam; and
an optical system comprising:
a first lens comprising a first surface and a second surface opposite to the first surface, the first lens having a first focal length,
a second lens comprising a third surface and a fourth surface opposite to the third surface, the second lens having a second focal length, and
a third lens between the first lens and the second lens, the third lens spaced apart from the first lens by twice the first focal length.

11. The laser device of claim 10, wherein the first focal length is smaller than the second focal length.

12. The laser device of claim 11, wherein the second focal length is greater than or equal to 1.2 times the first focal length and less than or equal to 1.6 times the first focal length.

13. The laser device of claim 10, wherein
a focal point of the first lens is a first focal point and a focal point of the third lens is a second focal point,
the first focal point is between the first lens and the third lens, and
the second focal point is between the third lens and the second lens.

14. The laser device of claim 10, wherein the second surface of the first lens and the third surface of the second lens are parallel to each other.

15. The laser device of claim 10, wherein
the first surface has a convex curved shape in a direction from the second surface toward the first surface of the first lens, and
the fourth surface has a convex curved shape in a direction from the third surface toward the fourth surface of the second lens.

16. The laser device of claim 10, wherein
the third lens comprises a fifth surface and a sixth surface opposite to the fifth surface,
the fifth surface has a convex curved shape in a direction from the sixth surface toward the fifth surface of the third lens, and
the sixth surface has a convex curved shape in a direction from the fifth surface toward the sixth surface.

17. The laser device of claim 10, wherein
the third lens comprises a fifth surface and a sixth surface opposite to the fifth surface, and
each of the fifth surface and the sixth surface is aspherical.

18. The laser device of claim 10, wherein optical axes of the first lens, the second lens, and the third lens are the same.

19. The laser device of claim 10, wherein a separation distance between the beam generator and the first lens is the same as the first focal length.

20. The laser device of claim 10, wherein the first laser beam and a second laser beam passing through the optical system have a same phase.

* * * * *